United States Patent
Fomenko

(10) Patent No.: US 7,222,138 B2
(45) Date of Patent: May 22, 2007

(54) VERSIONING APPLICATION PROGRAMMING INTERFACE AND METHOD FOR USING VERSIONING FUNCTIONALITY

(75) Inventor: Anatoli Fomenko, San Jose, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 813 days.

(21) Appl. No.: 10/081,000

(22) Filed: Feb. 20, 2002

(65) Prior Publication Data

US 2003/0158871 A1    Aug. 21, 2003

(51) Int. Cl.
*G06F 17/30* (2006.01)
(52) U.S. Cl. ...................................... 707/203
(58) Field of Classification Search ............. 707/1, 707/2, 10, 103 R; 717/122
See application file for complete search history.

(56) References Cited

U.S. PATENT DOCUMENTS

| | | | |
|---|---|---|---|
| 5,778,234 A | 7/1998 | Hecht et al. | 395/712 |
| 5,974,454 A | 10/1999 | Apfel et al. | 709/221 |
| 6,018,743 A * | 1/2000 | Xu | 707/103 R |
| 6,052,531 A | 4/2000 | Waldin, Jr. et al. | 395/712 |
| 6,681,382 B1 * | 1/2004 | Kakumani et al. | 717/122 |
| 2002/0116702 A1 * | 8/2002 | Aptus et al. | 717/170 |

OTHER PUBLICATIONS

Microsoft Computer Dictionary: Fifth Edition.*

* cited by examiner

*Primary Examiner*—Etienne P LeRoux
(74) *Attorney, Agent, or Firm*—Gunnison, McKay & Hodgson, L.L.P.; Forrest Gunnison

(57) ABSTRACT

A versioning Application Programming Interface (API) is provided for a software platform based on an object-oriented platform-independent programming language. The versioning API includes (a) main interfaces defining versioning functionality, the main interfaces allowing access to the versioning functionality, (b) a functional implementation of the main interfaces, the functional implementation including classes and libraries implementing the versioning functionality, the classes including a reference to a program module to perform a requested versioning function, and (c) a user interface for using the versioning functionality. The versioning API may further include native programming interfaces allowing code written in the object-oriented platform-independent language to operate with code written in a native language other than the object-oriented platform-independent language. The classes and some libraries are written in an object-oriented platform-independent programming language. Some libraries may include software routines written in the native programming language, and implement the native programming interfaces.

31 Claims, 11 Drawing Sheets

```
package javax.version;

public interface JVServer {
public JVRepository logintoRepository(String username,
String
password, String repositoryname) throws JVException;
public void logoutofRepository(JVRepository repository)
throws
JVException;
}
```

FIG. 6

```
public interface JVClient implements JVServer
```

FIG. 7

```
package javax.version;

public interface JVRepository { public JVRepositoryWorkspace
getRepositoryWorkspace(String
workspaceName) throws JVException;
public List listWorkspaces() throws TwException;
public void createWorkspace(String workspacename) throws
JVException;
public void deleteWorkspace(String workspacename) throws
JVException;
public void renameWorkspace(String oldWorkspacename,
String
newWorkspacename) throws JVException;
public void lock() throws JVException;
public void unlock() throws JVException;
}
```

FIG. 8

```
package javax.version;

public interface JVWorkspace { public boolean equals (Object o) ;

/**
* Checks whether workspace exists
*/
public boolean exists() throws JVException;

/**
* Returns workspace abs name
*/
public String getName();

/**
* @return false if user does not have access for specified
operation
* @param operation is from the set of predefined constants
*This method should always keep track of the user.
*/
public bool checkAccess(String operation) throws JVException;

/**
* @return false if user does not have access for specified
operation
*/
public bool checkAccess(String operation, String user) throws
JVException;

/**
* Add children to workspace
*/
public void addChildren(List children) throws JVException;

/**
* Remove children from workspace
*/
public void removeChildren(List children) throws JVException;

/**
* Get children of workspace
* @return List of Strings
*/
public List getChildren() throws JVException;
```

FIG. 9A

```
/**
 * Set children of workspace
 * @param children List of Strings
 */
public void setChildren(List children) throws JVException;

/**
 * Sets new parent workspace
 */
public void setParent(String newParent) throws JVException;

/**
 * Gets new parent workspace as String
 */
public String getParent() throws JVException;

/**
 * Sets new parent workspace
 */
public void setParentWorkspace(JVWorkspace newParentWorkspace)
throws JVException;

/**
 * Gets new parent workspace object
 */
public JVWorkspace getParentWorkspace() throws JVException;

/**
 * Changes workspace parent.
 * Reparents the workspace and updates the old parent metadata.
 */
public void reparent(JVWorkspace newParent, boolean force)
throws
JVException;

/**
 * Adds of files to the list of files in conflict.
 * @param conflicts List of Strings
 */
public void addConflicts(List conflicts) throws JVException;

/**
 * Removes files from the list of files in conflict
 * @param conflicts List of Strings
 */
public void removeConflicts(List conflicts) throws JVException;
```

FIG. 9B

```
/**
 * Sets the list of files in conflict.
 * @param conflicts List of Strings
 */
public void setConflicts(List conflicts) throws JVException;

/**
 * Gets the list of files in conflict.
 * @return List of Strings
 */
public List getConflicts() throws JVException;

/**
 * Locks workspace
 *TwLock should have the fields: type, cmd, PID (SID), host,
 * user, time. The constructor of JVLock should have these
arguments.
 */
public boolean lock(JVLock lock) throws JVException;

/**
 * Returns list of workspace locks
 */
public List getLocks() throws JVException;

/**
 * @return true if the lock exists
 */
public boolean checkLock(JVLock) throws JVException;

/**
 * Unlocks workspace
 */
public boolean unlock(JVLock lock) throws JVException;

/**
 * Creates a new physical ws, not a ws object
 */
public void createWorkspace() throws JVException;

/**
 * Deletes a new physical ws, not a ws object
 */
public void deleteWorkspace(boolean metaonly) throws JVException;

/**
 * Moves a workspace
 */
public void moveWorkspace(JVWorkspace dest) throws JVException;
```

FIG. 9C

```
/**
 * Returns workspace description object
 */
public JVDescription getDescription() throws JVException;

/**
 * Sets new description for workspace
 */
public void setDescription(JVDescription newDescription) throws
JVException;

/**
 * Returns access control object
 */
public JVAccess getAccess() throws JVException;

/**
 * Sets access control object
 */
public void setAccess(JVAccess newVal) throws JVException;

/**
 * Gets history object
 */
public JVHistory getHistory() throws JVException;

public void setHistory(JVHistory newVal) throws JVException;
/**
 * Gets putback validation object
 */
public JVPutbackValidation getPutbackValidation() throws
JVException;

/**
 * Sets putback validation object
 */
public void setPutbackValidation(JVPutbackValidation newVal)
throws
JVException;

public JVStatus getWorkspaceStatus() throws JVException;
public OutputStream getFile(String relPathName) throws
JVException;
public void putfile(InputStream istream, String relPathName)
throws JVException;
}
```

FIG. 9D

```
package javax.version;

public interface JVTransaction { public static final int NOT_STARTED = 0;
public static final int STARTED = 1;
public static final int FINISHED = 2;

/**
 * stops the transaction
 */
public JVTransactionOutput getOutput() throws JVException;

/**
 * @return one of the statuses defined in this interface
 */
public int detStatus() throws JVException;

/**
 * @return a List of checksum (statetable) comparison of 2
 * workspaces
 */
public List init() throws JVException;

/**
 * starts the transaction (non-blocking)
 */
public void start() throws JVException;

/**
 * stops the transaction
 */
public void stop() throws JVException;
}
```

FIG. 10

VERSIONING APPLICATION PROGRAMMING INTERFACE AND METHOD FOR USING VERSIONING FUNCTIONALITY

FIELD OF THE INVENTION

The present invention relates to version control and versioning system. More particularly, the present invention relates to a versioning Application Programming Interface (API) for a software platform based on an object-oriented platform-independent programming language and a method for using version control functionality via a versioning API.

BACKGROUND OF THE INVENTION

As new technologies such as client/server architecture, object-oriented programming, multi-platform deployment, and multi-language interoperability grow, software development projects become larger and more complex. Software developers work in groups rather than individually. They share information, data and responsibilities, and various phases and levels of the software development evolve concurrently, i.e., in parallel. In such a team/parallel development process, there is a greater possibility of duplicated effort, conflict between changes made by different developers, lost changes, and the like. As a result, most software development teams use a software configuration management (or source code management) (SCM) system. An SCM system keeps track of large software development projects, and typically includes a version control system, which maintains a database or a file system for revisions of the software under development. It is able to recreate each build of the software as well as to recreate earlier environments in order to assist in the maintenance of previous versions of a software product. It may also be used to prevent unauthorized access to files or to alert the appropriate users when a file has been altered.

Some SCM systems, such as Concurrent Versions Systems (CVS) for the open source projects, Forte™ TeamWare, available from Sun Microsystems, Inc. of Palo Alto, Calif., are used for development of applications written in an object-oriented, platform-independent programming language, for example, Java™, available from Sun Microsystems, Inc. of Palo Alto, Calif. Such a versioning system may be stand alone or integrated in an Integrated Development Environment (IDE). A typical IDE has a built-in versioning system. For example, VisualAge®, available from IBM® of Armonk, N.Y., has its own repository system (not history file-based), and Forte™ For Java™, also available from Sun Microsystems, Inc., includes CVS and generic versioning system modules. However, versioning systems employed in different IDEs, or a built-in versioning system and a standalone versioning systems are typically incompatible with each other. For example, file-based versioning systems typically rely on the file system permissions for manipulating the history files and metadata, and different file systems have different metadata structures though they may use the same underlying mechanism such as Revision Control System (RCS) or Source Code Control System (SCCS). In addition, although VisualAge® can talk to TeamWare™ via a public interface using a special module, the functionality of the module is very limited.

As shown in FIG. 1, an IDE 10 complying with a component-based platform-independent specification typically runs on a software platform 12 based on object-oriented platform-independent computer language, for example, a Java based platform such as Java 2 platform Standard Edition (J2SE™) and/or Java 2 platform Enterprise Edition (J2EE™). A platform is the hardware or software environment in which a program runs. Most platforms are hardware-based and can be described as a combination of hardware and the operating system (OS), such as UNIX® (available, for example, from Tarantella Inc. (formerly Santa Cruz Operation) of Santa Cruz, Calif.), Linux® (available, for example, from Caldera Systems Inc. of Orem, Utah), Solaris® (available from Sun Microsystems, Inc. of Palo Alto, Calif.), Windows 2000 (available from Microsoft Corporation of Redmond, Wash.), Windows® NT (available from Microsoft Corporation of Redmond, Wash.), or MacOS (available from Apple Computer Corporation of Cupertino, Calif.). A software-based, platform-independent platform (such as the Java platform) differs from hardware-based platforms in that it is a software-only platform and that it runs on top of the other hardware-based platform, for example, an OS-specific platform 14 as shown in FIG. 1.

A platform-independent software platform typically includes two components: an interpreter and application programming interfaces. For example, the Java platform includes the Java Virtual Machine (Java VM) and the Java Application Programming Interface (Java API). A computer program written in Java programming language is complied into Java byte code which is a platform-independent code which is an intermediate language. The Java VM is a run-time interpreter, and it translates the Java byte code into machine language for a specific hardware-based platform. The Java API is a large collection of software components that provide many capabilities, which is typically grouped into packages of related classes and interfaces. The Java API and the Java VM insulate the program from a hardware-based platform or a specific operating system.

There are many standard API packages for the platform-independent software platform. For example, for the Java platform, there are Java™ API packages that work on input-output (java.io), collections (java.util), remote connectivity (java.rmi), Java Database Connectivity (JDBC) (java..jdbc), and the like. Such APIs provide the application (such as IDE) with various functionality via the platform-independent platform, as well as customizing the IDE. However, there is no versioning API for the platform-independent software platform. Thus, applications and IDEs that run on the software platform cannot utilize versioning functionality in a compatible, standard manner.

BRIEF DESCRIPTION OF THE INVENTION

A versioning Application Programming Interface (API) is provided for a software platform based on an object-oriented platform-independent programming language. The versioning API includes (a) main interfaces defining versioning functionality, the main interfaces allowing access to the versioning functionality, (b) a functional implementation of the main interfaces, the functional implementation including classes and libraries implementing the versioning functionality, the classes including a reference to a program module to perform a requested versioning function, and (c) a user interface for using the versioning functionality. The versioning API may further include native programming interfaces allowing code written in the object-oriented platform-independent language to operate with code written in a native language other than the object-oriented platform-independent language. The classes and some libraries are written in an object-oriented platform-independent programming language. Some libraries may include software routines written in a native programming language other than the object-oriented platform-independent language, and implement the native programming interfaces.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIGS. 6–8 are diagrams illustrating an example of interfaces JVServer, JVClient, and JVRepsitory in accordance with one embodiment of the present invention.

FIGS. 9A–9D are diagrams illustrating an example of interface JVWorkspace in accordance with one embodiment of the present invention.

FIG. 10 is a diagram illustrating an example of interface JVTransaction in accordance with one embodiment of the present invention.

DETAILED DESCRIPTION

Embodiments of the present invention are described herein in the context of a versioning Application Programming Interface (API) and a method for using version control functionality via a versioning API. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines.

Figure 1:
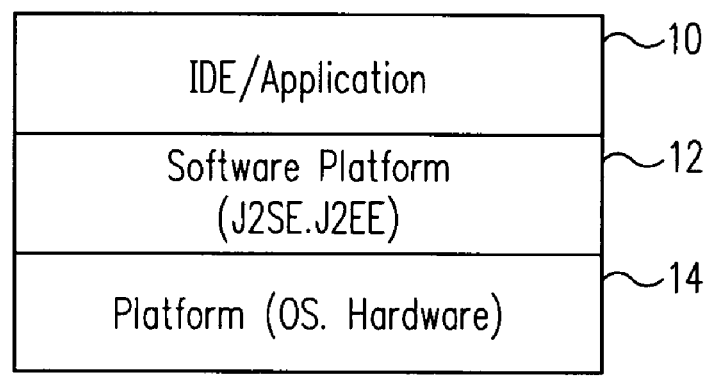
FIG. 1 is a diagram schematically illustrating a platform structure including a software-based platform and a hardware-based, OS specific platform.
Figure 2:
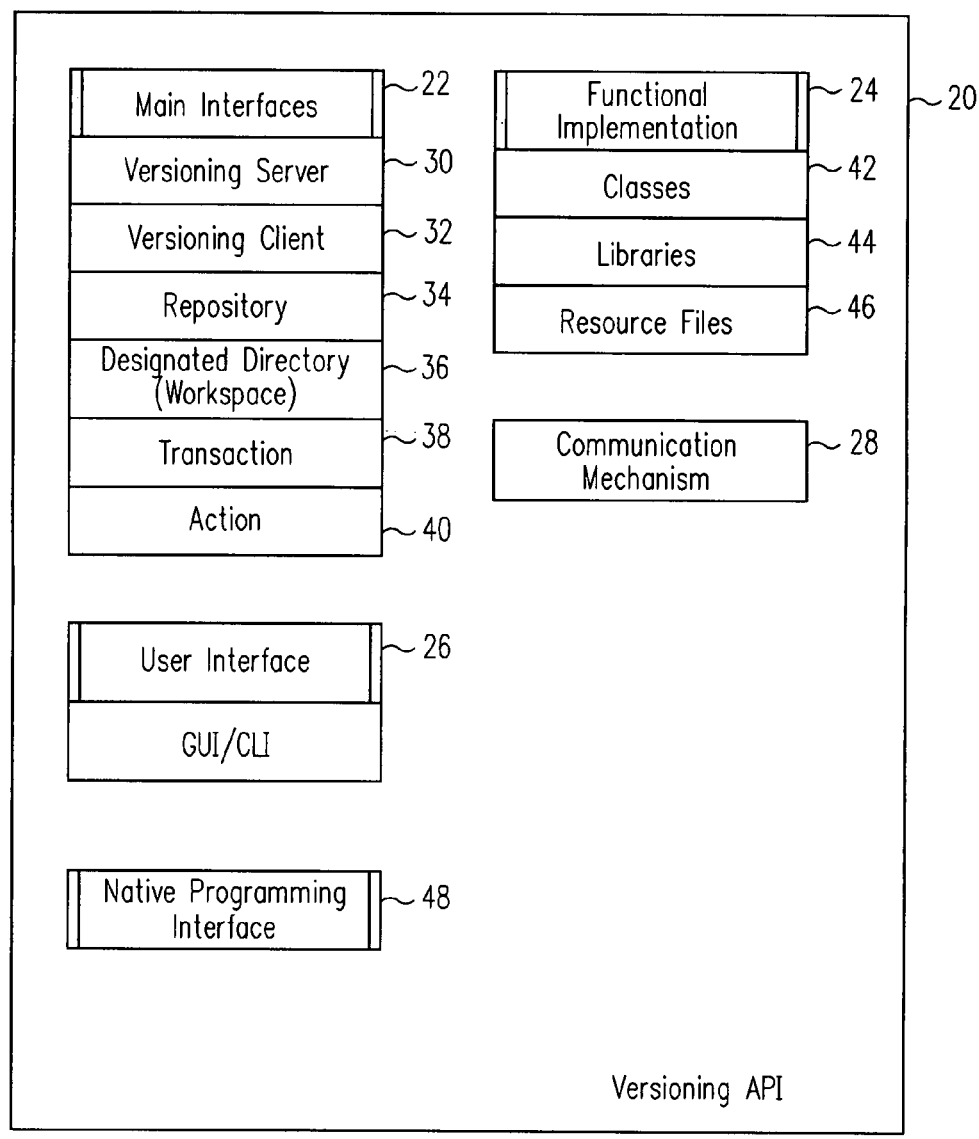
FIG. 2 is a diagram schematically and conceptually illustrating a versioning Application Programming Interface (API) for a software platform in accordance with one embodiment of the present invention.

FIG. 2 schematically and conceptually illustrates a versioning Application Programming Interface (API) 20 for a software platform in accordance with one embodiment of the present invention. The software platform is based on an object-oriented platform-independent programming language, such as Java. The versioning API 20 includes main interfaces 22, a functional implementation 24 of the main interfaces, and a user interface 26 for using the versioning functionality. The main interfaces 22 define versioning functionality and allow access to the versioning functionality. The functional implementation 24 includes classes 42 and libraries 44 implementing the versioning functionality defined by the main interfaces 22. The user interface 26 may include a graphic user interface (GUI) and/or a command line interface (CLI). The versioning API 20 may further include a communication mechanism 28 implementing client-server functionality to perform transactions between remote workspaces. In addition, the versioning API 20 may also include native programming interfaces 48.

An interface is a named collection of method definitions and defines a protocol of behavior that can be implemented by any class in the class hierarchy. An interface defines a set of method but does not implement them. An interface may also declare constants. A class that implements the interface agrees to implement all the methods defined in the interface, thereby agreeing to certain behavior. A class is a discrete module of code that has a set of variables (or fields) associated with it, as well as a set of function calls (or methods). Classes that implement an interface inherit the constants defined within that interface. When a class implements an interface, it is essentially signing a contract.

In general, the APIs are designed to extend the IDE with additional functionality that is fully integrated into the environment or software platform. The versioning API 20 represents an abstraction of a version control system (with the main interfaces 22), and includes classes, objects, and libraries that implement the version control system functionality. Other program modules and objects (for example, those of IDE or other application) utilize the versioning API when version control system functionality is needed.

For example, the version control system functionality of the versioning API 20 may include operations such as bringover, putback, checkout, check-in, freezepoint, lock, and the like, in accordance with a Copy-Modify-Merge model. The Copy-Modify-Merge model is employed, for example, by Forte™ TeamWare, available from Sun Microsystems, Inc. of Palo Alto, Calif. In accordance with this model, the data with which a software development team works is organized into files ("documents") and directories ("folders"). The files are placed in a special directory called a workspace. A workspace is a specially designated directory and its subdirectories. The workspace is called the "parent," and holds the master copy of all files ("master files"). Individual team members create their own workspace ("child" workspace) by copying the parent workspace ("bringover"). A child workspace is an exact copy of the current muster files in the parent workspace, and inherent all characteristics of the parent workspace. The individual team members work on their own copies of the files in the child workspace, and update them. Updating includes addition, deletion, and renaming of files. When the team member finish updating the files in the child workspace, the updated files are copied to the parent workspace, replacing the old files with the new ones ("putback").

The work of editing files is done in the child workspace, keeping the master copies safe and remain unchanged in the parent workspace. Before a file can be edited, it must be checked out by the user (a team member). That is, a writeable copy of the file is created. After editing the file, the update is saved and the file is checked in again.

A parent workspace may have multiple child workspaces, providing concurrent and parallel development of the software. Thus, there may be multiple versions of the same file over different child workspaces. When a user tried to put back files from a child workspace, the parent workspace first checks to see if an updated version of the files has already been put back from another child workspace. If not, the parent workspace accepts the putback and updates its version of the files. However, if the same files have ready been put back, a bringover update that contains the latest versions of the files is sent to the child workspace. The user must then resolve the differences before the putback of the merged file versions can take place. The merged files may be recompiled and tested before the putback. This operation may be referred to as "conflict."

When a user needs access to files in another user's child workspace, from within a single child workspace, only one user at a time may check out a file for editing (access control or "lock"). That is, a file that has been checked out by one user may not be checked out by another until the first person checks it in. In addition, one or more specific data versions of a workspace may be saved as a "freezepoint file" so that the exact state of the workspace can be re-created at some later time. The freezepoint file may be a list of deltas (differences) of file versions, and not a full copy of the workspace in order to make freezepoint files compact. Alternatively, the freezepoint file may contain a time stamp and a copy of the then current version of the files. A freezepoint file may be created at every bringover or putback. A freezepoint file may also be created at a selected time or in response to such a request.

In a typical team development environment, some of the team members may be local users, and others may be remote users who are located in a different site or working at home. For example, a user (client-side) may want to bring over a child workspace from the parent workplace which resides on a remote machine (server-side), or a remote user may want to check out a file from the child workspace. Such a client-server functionality (or remote capability) may also be provided by the versioning API 20.

As describer above, the main interfaces 22 define versioning functionality, and allow access to the versioning functionality. In accordance with one embodiment of the present invention, as shown in FIG. 2, the main interfaces 22 may include the following interfaces: an interface 30 defining versioning server functionality (e.g., VersioningServer), an interface 32 defining versioning client functionality (e.g., VersioningClient), an interface 34 defining versioning repository functionality (e.g., VersioningRepository), an interface 36 defining designated directory structures and access to the designated directory structures (e.g. Workspace), and an interface 38 defining transactions between the designated directory structures (e.g., Transaction). The main interfaces 22 may also include an interface 40 defining file actions within a designated directory structure (e.g., VersioningAction).

The functional implementation 24 includes classes 42 and libraries 44 implementing the versioning functionality defined by the main interfaces 22. The classes 42 include a reference to a program module to perform a requested versioning function. A library is a set of software routines or collection of program modules. The functional implementation 24 may also include resource files 46 available to the classes 42 and libraries 44. Such resource files 44 may be Hyper Text Markup Language (HTML) files, Graphics Interchange Format (GIF) files, Extensible Markup Language (XML) files, templates, and the like.

The remote capability of the versioning system described above, may be defined by the VersioningServer interface 30 and the VersioningClient interface 32, and be implemented in the communication mechanism 28. It should be noted that the interface names, as well as class names, are presented by way of example and are not intended to be exhaustive or limiting in any way.

Figure 3:
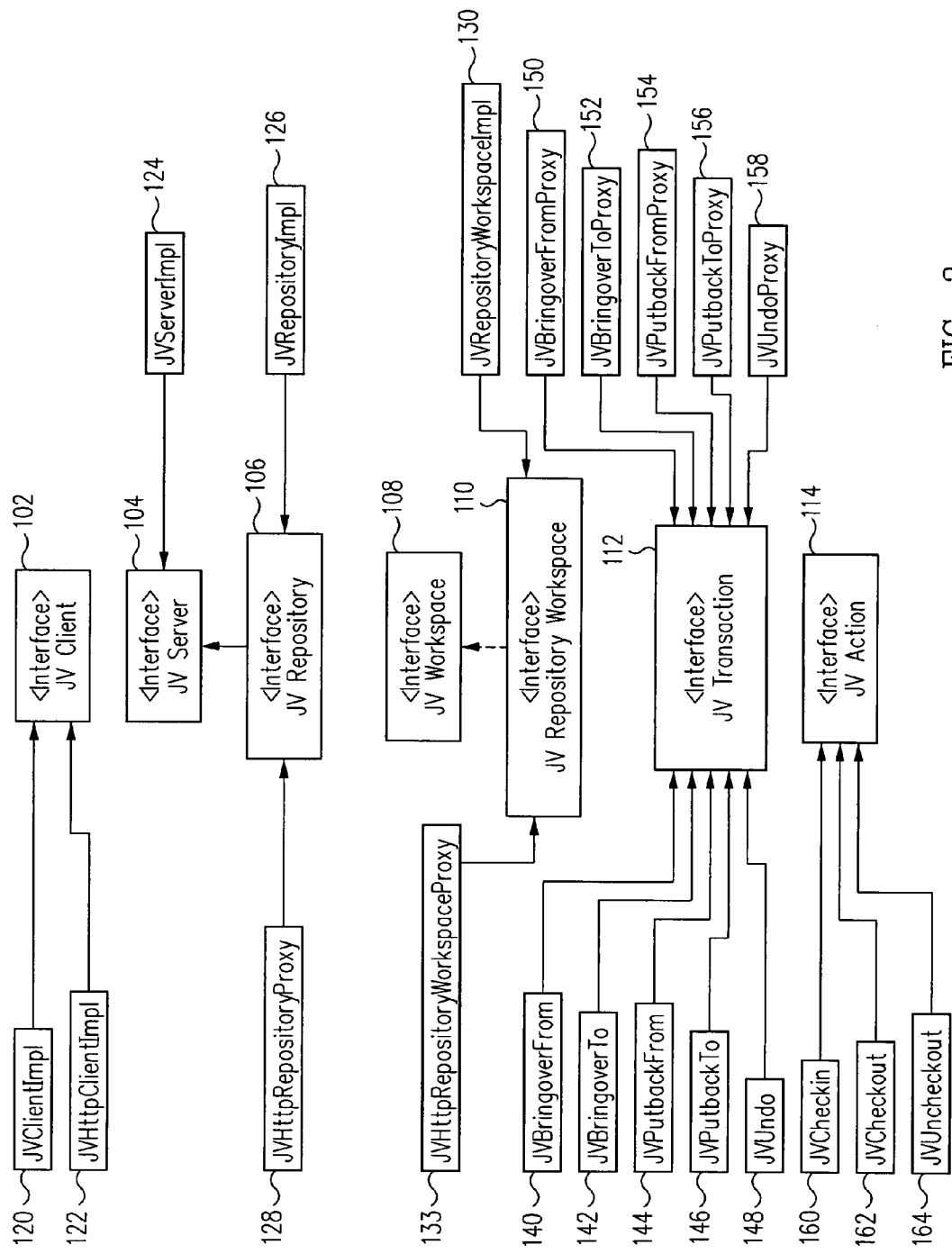
FIG. 3 is a class diagram schematically illustrating an example of the interface/class structure of a versioning API employing Java programming language in accordance with one embodiment of the present invention.

FIG. 3 schematically illustrates an example of the interface/class structure (class diagram) of a versioning API employing Java programming language in accordance with one embodiment of the present invention. As shown in FIG. 3, the main interfaces include JVClient (interface 102 defining Java versioning client functionality), JVServer (interface 104 defining Java versioning server functionality), JVRepository (interface 106 defining Java versioning repository functionality), JVWorkspace (interface 108 defining workspaces and access to workspaces), JVRepositoryWorkspace (interface 110 extending JVWorkspace to the versioning functionality of workspaces stored in a repository), JVTransaction (interface 112 defining transactions between workspaces), and JVAction (interface 114 defining file actions in a workspace). The term "repository" refers to an entity, for example, a file system where master copies of workspace, or links to master copies of the workspaces are stored. A workspace inside the repository is referred to as a repository workspace. The repository can contain zero or more repository workspaces at any given time. The versioning server functionality includes managing and providing access to the repository and it contents. The versioning client functionality includes sending massages to the versioning server to access the repository and its contents.

The classes 120–164 implement the above-described versioning functionality as follows. In the client side, JVClientImpl 20 (implementing client functionality) and JVHttpClientImpl 122 (implementing remote capability over Hyper Text Transport Protocol (HTTP)) implement the interface 102. It should be noted that the remote client-server communication is not limited to HTTP, but may also Hyper Text Transfer Protocol Secure (HTTPS) or any other hyper text transfer type protocol. For interfaces JVRepository 106 and JVServer 104, the server-side classes JVServerImpl 124 and JVRepositoryImpl 126 and the client-side class JVHttpRepositoryProxy 128 implement the corresponding functionality. Similarly, for interface JVRepositoryWorkspace 110, the server-side class JVRepositoryWorkspaceImpl 130 and the client-side class JVHttpRepositoryWorkspaceProxy 132 implement the workspace functionality with the remote capability (client-server communication). For interfaces JVTransaction 112 and JVAction 114, various classes implement transactions between workspaces and operations on the workspaces (and files therein). For the client-side, such classes include JVBringoverFrom 140, JVBringoverTo 142, JVPutbackFrom 144, JVPutbackTo 146, and JVUndo 148, and for the server-side JVBringoverFromProxy 150, JVBringoverToProxy 152, JVPutbackFromProxy 154, JVPutbackToProxy 156, and JVUndoProxy 158.

In object-oriented programming, a method is performed by a program module (object) which is called from a class. Thus, a class implementing the versioning functionality includes function calls (references or link) to corresponding methods that performs requested processes/functions. For example, classes BringoverFrom and BringoverTo, which methods performs the above-described "bringover" operation, includes a reference to a program module for copying master files stored in a first directory structure (the parent workspace) and thereby creating a set of working files, and a reference to a program module for storing the set of working files in a second directory structure (child workspace), respectively. Similarly, in order to perform the "putback" operation using its method, class PutbackFrom includes a reference to a program module for copying the working files in the child workspace thereby creating a set of updated files, and class PutbackTo includes a reference to a program module for replacing a corresponding set of the master files in the parent workspace with the set of updated files. A class for facilitating an "undo" operation to a previous transaction may also be provided.

The class methods may call other methods of the same or different class. A class may include a reference to another class, as well as a reference to a program module for another class. However, references to other classes or modules should be known to the first class. For example, a class implementing the "conflict check" operation (e.g., class Conflict) may include a reference to a program module for receiving a request for replacing the master files with a set of updated files, and checking for a previous replacement of the master files with another set of updated files, a reference to the class PutbackTo, a reference to the class BringoverFrom, and a reference to the class BringoverTo. The reference to the class PutbackTo is invoked if there is no previous replacement of the master files, so that the updated files are bring-over to the parent workspace. If there is a previous replacement of the master files, the references to the class BringoverFrom an to the class BringoverTo are invoked instead, so that any conflict between the previous updates and the current updates are reconciled before bringing-over to the parent workspace.

Classes implementing the operations within a child workspace may include classes Checkout and Checkin. For example, the class Checkout includes a reference to a program module for creating a writeable copy of a working file stored in the second directory structure, and a reference to a program module for storing the writeable copy to a requested address. Similarly, the class Checkin includes a reference to a program module for copying the writeable copy of a requested address so as to create an updated working file, and a reference to a program module for replacing the working file with the updated working file.

In addition, a class for implementing access control may also be provided, for example, class Lock. The class Lock includes a reference to a program module for receive a request for creating a writeable copy of a working file and checking whether a writeable copy of the working file has already been created. If so, the requested file has already been checked out to someone else, and thus the request will be rejected. If not, the class Lock will call the class Checkout to perform the requested checkout operation.

Furthermore, a class implementing the freezepoint operation (e.g., class Freezepoint) may include a reference to a program module for creating freezepoint files for files in a specified directory structure. The freezepoint files may store a specific time stamp and a then current version of the corresponding files.

The functional implementation of the main interfaces includes various classes and libraries, as described above. In accordance with one embodiment of the present invention, such libraries include first libraries written in an object-oriented platform-independent programming language (such as Java), and second libraries having software routines written in a native programming language other than the object-oriented platform-independent language (such as C and/or C++). In such a case, as shown in FIG. 2, the versioning API 20 may utilizes the native programming interfaces 48. A native programming interface allows code written in the object-oriented platform-independent language to operate with code written in a native language other than the object-oriented platform-independent language.

By implementing the native programming interfaces 48 in the second ("native") libraries, the methods and functions written in a native programming language can be called from the class written in the platform-independent language. For example, an implementation class may include a first reference to a first library and a second reference to a native function and a second library. The first reference is invoked if a requested versioning function is implemented with the object-oriented platform-independent programming language. The second reference is invoked, using the native programming interface, if the requested versioning function is implemented in the second library with the native programming language.

For example, Java Native Interface (JNI) is such a native programming interface. The JNI allows Java code that runs within a JVM to operate with applications and libraries written in other languages, such as C, C++, and assembly. The JNI is used to write native methods to handle those situations when an application is not written entirely in Java programming language. For example, some program-dependent or operating system-dependent features are needed by a version control system, or some libraries may be written explicitly to solve a problem that is best handled outside of the Java programming environment. Using the JNI framework, a Java method can call a native method, pass it the required parameters, and get the results back when the native method completes, and vice versa. Thus, both the native language side and the Java side of an application can create, update, and access Java objects and then share these objects between them. In particular, exceptions can be caught and thrown from the native method and handled in the Java application.

Figure 4:
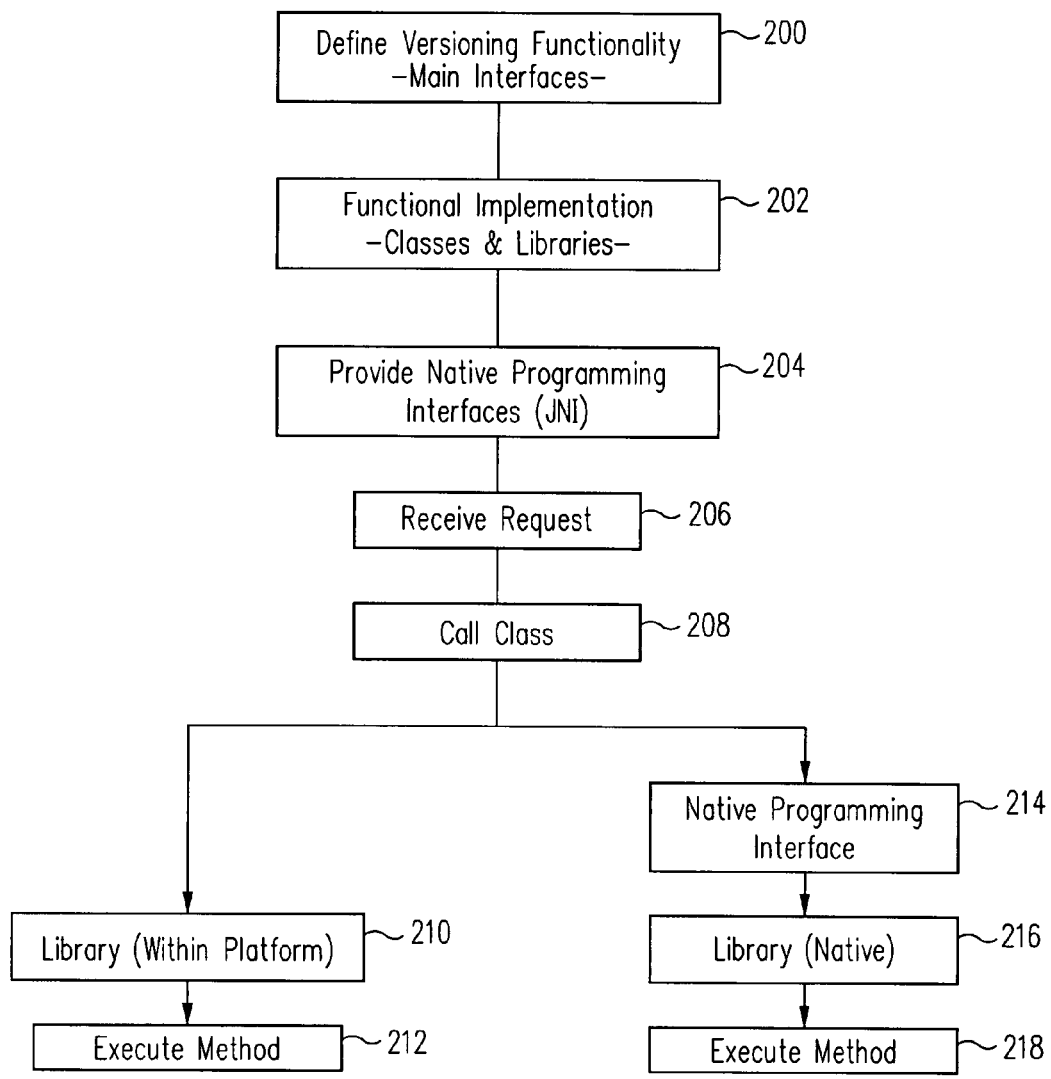
FIG. 4 is a diagram schematically illustrating a method for using version control functionality via a versioning API in accordance with one embodiment of the present invention.

FIG. 4 schematically illustrates a method for using version control functionality via a versioning Application Programming Interface (API) in accordance with one embodiment of the present invention. The versioning API is provided in a software platform based on an object-oriented platform-independent programming language. As shown in FIG. 4, the versioning functionality is defined in main interfaces of the versioning API (200). The defined versioning functionality is implemented in classes and libraries of the versioning API (202). The libraries may include first libraries written in an object-oriented platform-independent programming language, and second libraries written in a native programming language other than the object-oriented platform-independent language. Native programming interfaces are also provided (204). The native programming interfaces (for example, JNIs) allow code written in the object-oriented platform-independent language (for example, Java) to operate with code written in a native language other than the object-oriented platform-independent language (for example, C and/or C++). The second libraries include native programming interface implementation so as to utilize the native programming interface framework.

When a request for a versioning function is received from a client (206), a class that implements the requested versioning function is called (208). If the requested versioning function (or method) is implemented in the first library written in the object-oriented platform-independent program language, the first library is called directly from the class (210). That is, the requested method is invoked within the platform-independent software platform scheme, for example, via the Java VM, and the method is executed accordingly (212). If a requested versioning function is implemented in the second library written in a native language other than the object-oriented platform-independent language, a corresponding native programming interface is called (214). Typically the second library is outside of the platform-independent software platform. Using the native programming interface, the second library is invoked (216) and the corresponding method is executed (218).

Figure 5:
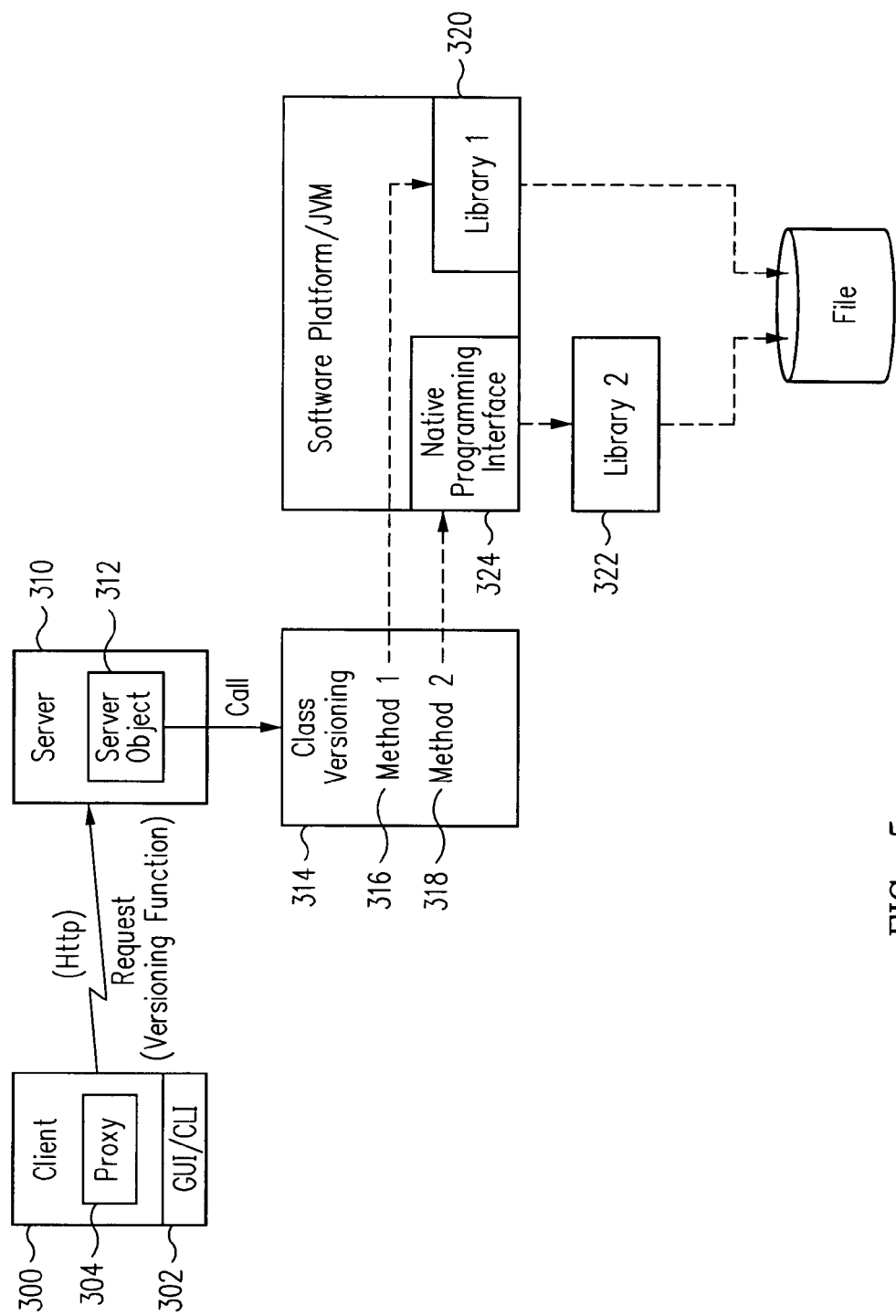
FIG. 5 is a diagram schematically illustrating a method for using version control functionality via a versioning API in a distributed environment, in accordance with one embodiment of the present invention.

FIG. 5 schematically illustrates a method for using version control functionality via a versioning API in a distributed environment, in accordance with one embodiment of the present invention. As shown in FIG. 5, a version control system application (the classes and libraries implementing the version control system functionality) utilizes a client-server communication scheme, and is distributed to a remote client 300 and a versioning server 310. The versioning server 310 is deployed to a hosting server running on the software platform. For example, the hosting server may be a web server such as Tomcat, available from the Apache Software Foundation, or an application server such as a reference implementation for Java 2 platform, Enterprise Edition (J2EE™), iPlanet™ Application Server, or iPlanet™ Web Server, available from Sun Microsystems, Palo Alto, Calif., The client 300 and the versioning server 310 communicate using one of the remote communication mechanism, such as Servlets, Remote Method Invocation (RMI), or Simple Object Access Protocol (SOAP). In addition, such a communication scheme may include a plugable communication mechanism with a default implementation, such as servlets or Web Services. The communication mechanism may also include other remote communication facilities, such as authentication and security, using, for example, Java Authentication and Authorization Service (JAAS), secure connection via secure socket layer (SSL), and the like.

As shown in FIG. 5, the client 300 may be provided with a user interface 302 such as GUI and/or CLI. The client 300 makes a call for a method of a proxy object 304. The proxy object 304 is associated with a type of versioning transaction, such as bringover, putback, or the like. In the client-side, the call for the method is converted to a request 306 of the method, and the request 306 is transmitted to the server 310. A servlet (not shown in FIG. 5) is invoked at the server 310 to generate a response to the request. The servlet delegates processing of the request to a server object 312. The server object 312 calls a class 314 that includes the requested method. For example, the class 314 may include a method 316 of a first type and a method 318 of a second type. The method 316 of the first type is implemented in a first library 320 written in the object-oriented platform-independent program language, typically provided within the software platform scheme. The method 318 of the second type is implemented in a second library 322 written in a native language other than the object-oriented platform-independent program language.

When a requested method is of the first type, the method is directly invoked from the class 314, and the corresponding program modules and/or routines in the first library 320 are executed, and the requested versioning function (of the first library 320) is performed to the workspace(s) and/or files contained therein. When the requested method is of the second type, the method is called from the class 314 using a native programming interface 324. The required parameters are passed to the native (second) library 322 through the native programming interface 324, and the results is sent back through the native programming interface 324 when the native method completes. It should be noted that although the class 314 is illustrated as it includes the both types of methods, some classes may include only methods of the first type, and others only methods of the second type.

The main interfaces and functional implementation thereof may be packaged as, for example, the Java Versioning API package: javax.version. FIGS. 6–10 illustrate examples of some of the main interfaces described above. However, they are presented by way of example and are not intended to be exhaustive or limiting in any way.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A versioning Application Programming Interface (API) for a software platform based on an object-oriented platform-independent programming language, said versioning API comprising:
   main interfaces defining versioning functionality, said main interfaces allowing access to the versioning functionality;
   a functional implementation of said main interfaces, said functional implementation comprising classes and libraries implementing the versioning functionality, said classes including a reference to a program module to perform a requested versioning function;
   native programming interfaces allowing code written in the object-oriented platform-independent language to operate with code written in a native language other than the object-oriented platform-independent language; and
   a user interface for using the versioning functionality.

2. The versioning API according to claim 1, further comprising a communication mechanism implementing client-server functionality.

3. The versioning API according to claim 1 wherein said main interfaces comprising:
   an interface-defining versioning server functionality;
   an interface defining versioning client functionality;
      an interface defining versioning repository functionality;
      an interface defining designated directory structures and access to the designated directory structures; and
      an interface defining transactions between the designated directory structures.

4. The versioning API according to claim 3 wherein said main interfaces further comprising:
   an interface defining file actions within a designated directory structure.

5. The versioning API according to claim 1 wherein said functional implementation comprising:

classes and first libraries written in an object-oriented platform-independent programming language; and second libraries including software routines written in a native programming language other than the object-oriented platform-independent language, said second libraries implementing said native programming interfaces.

6. The versioning API according to claim 5 wherein said classes comprise:

an implementation class including:
   a reference to a first library, said reference being invoked if a requested versioning function is implemented with the object-oriented platform-independent programming language; and
   a reference to a native function and a second library, said reference being invoked, using a native programming interface, if a requested versioning function is implemented with the native programming language.

7. The versioning API according to claim 5 wherein said functional implementation further comprising:
   resource files available to said classes and libraries.

8. The versioning API according to claim 1 wherein the classes comprise:
   a class BringoverFrom including a reference to a program module for copying master files stored in a first directory structure and thereby creating a set of working files; and
   a class BringoverTo including a reference to a program module for storing the set of working files in a second directory structure.

9. The versioning API according to claim 8 wherein the classes further comprise:
   a class PutbackFrom including a reference to a program module for copying the working files in the second directory structure and thereby creating a set of updated files; and
   a class PutbackTo including a reference to a program module for replacing a corresponding set of the master files in the first directory structure with the set of updated files.

10. The versioning API according to claim 9 wherein the classes further comprise:
   a class Conflict including:
      a reference to a program module for receiving a request for replacing the master files with a set of updated files, and checking for a previous replacement of the master files with another set of updated files;
      a reference to said class PutbackTo;
      a reference to said class BringoverFrom; and a reference to said class BringoverTo.

11. The versioning API according to claim 10 wherein said reference to said class PutbackTo is invoked it there is no previous replacement of the master files.

12. The versioning API according to claim 10 wherein said reference to said class BringoverFrom and said reference to said class BringoverTo are invoked if there is a previous replacement of the master files.

13. The versioning API according to claim 9 wherein the classes further comprise:
   a class Checkout including:
      a reference to a program module for creating a writeable copy of a working file stored in the second directory structure; and
      a reference to a program module for storing the writeable copy to a requested address; and a class Checkin including:
         a reference to a program module for copying the writeable copy of a requested address so as to create an updated working file; and
         a reference to a program module for replacing the working file with the updated working file.

14. The versioning API according to claim 13 wherein the classes further comprise:
   a class Lock including a reference to a program module for receive a request for creating a writeable copy of a working file and checking whether a writeable copy of the working file has already been created.

15. The versioning API according to claim 8 wherein the classes further comprise:
   a class Freezepoint including a reference to a program module for creating freezepoint files for files in a specified directory structure, the freezepoint files storing a specific time stamp and a then current version of the corresponding files.

16. The versioning API according to claim 1 wherein said user interface comprises at least one of:
   a graphic user interface; and
   a command line interface.

17. A method for using version control functionality via a versioning Application Programming Interface (API) provided in a software platform based on an object oriented platform-independent programming language, said method comprising:
   defining versioning functionality in main interfaces of said versioning API;
   implementing the versioning functionality in classes and libraries of said versioning API, the libraries including:
      first libraries written in an object-oriented platform-independent programming language, and
      second libraries written in a native programming language other than the object-oriented platform-independent language; and
   providing native programing interfaces allowing code written in the object-oriented platform-independent language to operate with code written in a native language other than the object-oriented platform-independent language, the second libraries including native programming interface implementation.

18. The method according to claim 17, further comprising:
   receiving, from a client, a request for a versioning function;
   calling a class implementing the requested versioning function;
   invoking a first library from the class, if the requested versioning function is implemented in the first library written in the object-oriented platform-independent program language; and
   using a native programming interface from the class, so as to invoke a second library if a requested versioning function is implemented in the second library written in a native language other than the object-oriented platform-independent language.

19. The method according to claim 17 wherein the classes and libraries are mounted with a versioning server application deployed to a hosting server running on the software platform, the software platform being based on the object-oriented platform-independent programming language, said method further comprising:
   making a call for a method of a proxy object at the client, the proxy object being associated with a type of versioning transaction;

converting the call for a method to a request of the method;
transmitting the request to the hosting server; and
invoking a servlet at the hosting server to generate a response to the request, the servlet delegating processing of the request to a server object calling a class including the requested method;
invoking, from the class, the method directly if the requested method is implemented in a first library written in the object-oriented platform-independent program language; and
invoking, from the class, the method using a native programming interface if the requested method is implemented in a second library written in a native language other than the object-oriented platform-independent program language.

20. The method according to claim 19 wherein said making a call is performed with a graphic user interface.

21. The method according to claim 19 wherein said making a call is performed with a command line interface.

22. The method according to claim 17 wherein said defining versioning functionality comprising:
defining versioning server functionality;
defining versioning client functionality;
defining versioning repository functionality;
defining designated directory structures access to the designated directory structures; and
defining transactions between the designated directory structures.

23. The method according to claim 22 wherein said defining versioning functionality further comprising:
defining file actions within a designated directory structure.

24. The method according to claim 17 wherein in said implementing, the versioning functionality is further implemented in resource files available to the classes and libraries.

25. The method according to claim 17 wherein the versioning functionality implemented in classes and libraries comprises:
copying master files stored in a first directory structure and thereby creating a set of working files; and
storing the set of working files in a second directory structure.

26. The method according to claim 25 wherein the versioning functionality implemented in classes and libraries further comprises:
copying the working files in the second directory structure and thereby creating a set of updated files; and
replacing the master files in the first directory structure with the set of updated files.

27. The method according to claim 26 wherein the versioning functionality implemented in classes and libraries further comprises:
receiving a request for replacing the master files with a set of updated files, and checking for a previous replacement of the master files with another set of updated files;
calling said replacing if there is no previous replacement of the master files since a previous copying of the master files; and
calling said copying master files and said storing it there is a previous replacement of the master files since a previous copying of the master files.

28. The method according to claim 26 wherein the versioning functionality implemented in classes and libraries further comprises:
creating a writeable copy of a working file stored in the second directory structure; and
storing the writeable copy to a requested address.

29. The method according to claim 28 wherein the versioning functionality implemented in classes and libraries further comprises:
copying the writeable copy so as to create an updated working file; and
replacing the working file in the second directory with the updated working file.

30. The method according to claim 29 wherein the versioning functionality implemented in classes and libraries further comprises:
receive a request for creating a writeable copy of a working file; and
checking whether a writeable copy of the working file has already been created.

31. The method according to claim 26 wherein the versioning functionality implemented in classes and libraries further comprises:
creating freezepoint files for files in a specified directory structure, the freezepoint files storing a specific time stamp and a then current version of the corresponding files.

* * * * *

UNITED STATES PATENT AND TRADEMARK OFFICE
CERTIFICATE OF CORRECTION

PATENT NO.         : 7,222,138 B2                                         Page 1 of 1
APPLICATION NO.    : 10/081000
DATED              : May 22, 2007
INVENTOR(S)        : Anatoli Fomenko It is certified that error appears in the above-identified patent and that said Letters Patent is hereby corrected as shown below:

In Column 14, Claim 27, Line 15, change "it" to --if--.

Signed and Sealed this

Eleventh Day of September, 2007

JON W. DUDAS
*Director of the United States Patent and Trademark Office*